United States Patent
Hoffer

[15] 3,676,439
[45] July 11, 1972

[54] 5,6-DIHYDRO-8,8-DIMETHYL-3-NITRO-8H IMIDAZO(2-1-C) (1,4)OXAZINE

[72] Inventor: Max Hoffer, Nutley, N.J.
[73] Assignee: Hoffmann-La Roche Inc., Nutley, N.J.
[22] Filed: April 13, 1971
[21] Appl. No.: 133,737

[52] U.S. Cl. ..........................260/244 R, 260/309, 424/248
[51] Int. Cl. .........................................................C07d 87/20
[58] Field of Search..................................................260/244

[56] References Cited
UNITED STATES PATENTS 3,390,150   6/1968   Henry....................................260/244

Primary Examiner—Henry R. Jiles
Assistant Examiner—Harry I. Moatz
Attorney—Samuel L. Welt, Jon S. Saxe, Bernard S. Leon, Gerald S. Rosen, R. Hain Swope and William M. Farley

[57] ABSTRACT

5,6-Dihydro-8,8-dimethyl-3-nitro-8H-imidazo(2-1-c)(1,4)oxazine and its pharmaceutically acceptable salts are described. The compounds are antiprotozoal agents.

1 Claim, No Drawings

3,676,439

5,6-DIHYDRO-8,8-DIMETHYL-3-NITRO-8H IMIDAZO(2-1-C) (1,4)OXAZINE

DETAILED DESCRIPTION OF THE INVENTION

The present invention relates to the novel antiprotozoal compound 5,6-dihydro-8,8-dimethyl-3-nitro-8H-imidazo(2-1-c)(1,4) oxazine, its pharmaceutically acceptable salts and its preparation. The active compound of the invention possesses valuable pharmaceutical utility in the treatment of infections due to pathogenic protozoa.

The novel active compound of the invention, 5,6-dihydro-8,8-dimethyl-3-nitro-8H-imidazo(2-1-c)(1,4)oxazine, is prepared by heating a 2-isopropenyl-4-(or 5)nitroimidazole compound with an excess of monotosylglycolate. The reaction is preferably carried out in an inert organic solvent such as, for example, alkanols, e.g., methanol, ethanol and the like; hydrocarbons such as benzene, xylene and the like; tetrahydrofuran, dioxane and the like and preferably at an elevated temperature, i.e., a temperature between about 100°–150° C., preferably between about 120°–135°.

The starting material, i.e., 2-isopropenyl-4(or 5)nitroimidazole is prepared in accordance with the following synthesis. Initially, an aldehyde represented by the general formula

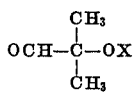

wherein X may be hydrogen or methyl, is reacted with glyoxal and ammonia at a temperature of from about 0° C. to about 80° C. and the reaction mixture allowed to stand for about 48 hours. The product, which is represented by the general formula

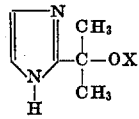

wherein X has the meaning given, is then iodinated by methods conventional in the art to form diiodo compounds represented by the general formula

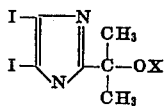

wherein X has the meaning given.

The diiodo compounds are then nitrated by conventional procedures, preferably by an equal mixture of concentrated nitric and sulfuric acids at room temperature and below, to form nitroiodoimidazoles represented by the general formula

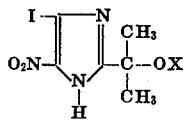

wherein X has the meaning given.

The nitro-iodoimidazoles are then treated with sodium borohydride in alkaline aqueous or alcoholic media at a temperature of from about −25° C. to about 60° C. to form compounds represented by the general formula

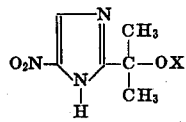

wherein X has the meaning given.

The resulting nitroimidazoles are then treated to remove a molecule of water or methanol, depending on whether X is hydrogen or methyl, respectively, to form 2-isopropenyl-4(or 5) nitroimidazole. This step is accomplished, for example, by heating the nitroimidazole to from about 70° C. to about 100° C. in the presence of a strong mineral acid such as, for example, sulfuric acid.

Alternatively, nitro-iodoimidazoles are treated as described above to remove a molecule of water or methanol, depending on whether X is hydrogen or methyl, respectively, to form an intermediate represented by the general formula

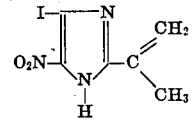

which is then treated with sodium borohydride as described above to yield 2-isopropenyl-4(or 5)nitroimidazole.

The 2-isopropenyl-4(or 5)nitroimidazole prepared by either of the above methods is thereafter converted in accordance with the present invention to yield 5,6-dihydro-8,8-dimethyl-3-nitro-8H-imidazo(2-1-c)(1,4)oxazine by the following reaction sequence:

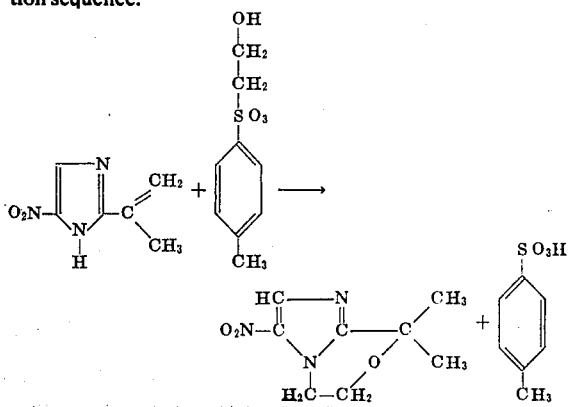

The active compound of the present invention, i.e., 5,6-dihydro-8,8-dimethyl-2-nitro-8H-imidazo(2-1-c)(1,4)oxazine can, if desired, be converted into pharmaceutically acceptable acid addition salts by reaction with a pharmaceutically acceptable acid. Suitable acids are, for example, inorganic acids such as hydrohalic acids, phosphoric acid, sulfuric acid and the like, and organic acids such as acetic acid, maleic acid, tartaric acid, citric acid, succinic acid and the like. A preferred salt is the hydrochloride which is formed, for example, by dissolving 5,6-dihydro-8,8-dimethyl-3-nitro-8H-imidazo(2-1-c)(1,4)oxazine in a suitable organic solvent and adding alcoholic hydrochloric acid.

The novel therapeutic compound of the present invention, 5,6-dihydro-8,8-dimethyl-3-nitro-8H-imidazo(2-1-c)(1,4)oxazine, and its pharmaceutically acceptable acid addition salts are useful as chemotherapeutic agents. In particular, they are useful in the treatment of infections due to pathogenic protozoa such as certain species of amoebae, e.g., *E. histolytica*, and as trichomonacides against, for example, *Trichomonas vaginalis* and *Trichomonas foetus*.

5,6-Dihydro-8,8-dimethyl-3-nitro-8H-imidazo(2-1-c)(1,4)oxazine was tested against *Trichomonas vaginalis* and *Trichomonas foetus* in the following manner. For local activity against *T. vaginalis*, groups of eight mice are infected with approximately 500,000 cells of organism subcutaneously on the abdominal surface. The animals are treated subcutaneously at the site of infection with a dose of 1,000 mcg. of test drug in 1 ml. of solution on the day of infection and the following day. The mice are examined the third day after infection for lesions at the site of infection. An infected but untreated group of eight mice is utilized as a control. The $CD_{50}$ value is calculated using the method of Reed and Muench, Amer. Jour. Hygiene 27:493, 1938 and expressed in mcg/ml. 5,6-Dihydro-8,8-dimethyl-3-nitro-8H-imidazo(2-1-c)(1,4)oxazine was found by this procedure to be very active having a $CD_{50}$ value of 0.9 mcg/ml.

Similarly infected mice were treated per os on the day of infection and the following three days with various doses of test drug. The animals were sacrificed on the seventh day after infection and examined for the presence or absence of lesions at the site of infection. By this procedure 5,6-dihydro-8,8-dimethyl-3-nitro-8H-imidazo(21-c)(1,4)oxazine was shown to be highly effective via oral administration having a $CD_{50}$ value of 5.3 mg/kg.

Activity against *T. foetus* was determined by individually infecting groups of eight mice intraperitoneally with 1.0 ml. of undiluted culture which contains approximately 7 million cells. The animals are treated daily for 3 days after infection with maximum tolerated dose of active drug per os and are then sacrificed after 14 days. Infected, untreated control mice usually succumbed within 7 days after infection. The death rate is the criterion of the activity of the drug. The $CD_{50}$ value is calculated by the above method. By this method 5,6-dihydro-8,8-dimethyl-3-nitro-8H-imidazo(2-1-c)(1,4)oxazine was shown to be highly active against *T. foetus* having a $CD_{50}$ value of 7.4 mg/kg. per os.

Additionally, 5,6-dihydro-8,8-dimethyl-3-nitro-8H-imidazo(2-1-c)(1,4)oxazine is well tolerated orally having an $LD_{50}$ of greater than 500 mg/kg. per os.

5,6-Dihydro-8,8-dimethyl-3-nitro-8H-imidazo(2-1-c)(1,4)-oxazine and its pharmaceutically acceptable acid addition salts, in accordance with the invention, can be administered systemically, for example, orally, locally, e.g., topically or subcutaneously with dosages adjusted to meet individual requirements. In general, unit dosage forms containing from about 50 mg. to about 500 mg. of 5,6-dihydro-8,8-dimethyl-3-nitro-8H-imidazo(2-1-c)(1,4) oxazine or the equivalent amount of a pharmaceutically acceptable salt thereof are administered once or twice daily. In the preparation of such unit dosage forms, 5,6-dihydro-8,8-dimethyl-3-nitro-8H-imidazo(2-1-c)(1,4)oxazine or pharmaceutically acceptable salts thereof may be admixed with conventional organic or inorganic pharmaceutical carrier materials such as, for example, starches, lactose, sucrose, gelatin, magnesium stearate, talc, vegetable oils, gums and the like. Such pharmaceutical compositions can also contain, in addition, other therapeutically valuable substances or they can contain conventional pharmaceutical adjuvants such as preservatives, stabilizing agents, wetting agents, emulsifying agents and the like. The pharmaceutical preparations can be in conventional solid forms such as tablets, capsules and the like, conventional liquid forms such as suspensions, emulsions and the like and other conventional dosage forms such as suppositories, vaginal tablets and the like. Such preparations may be submitted to conventional pharmaceutical expedients such as, for example, sterilization and the like.

The following examples illustrate the invention. All temperatures are in degrees centigrade.

EXAMPLE 1

45 grams of α-hydroxyisobutyraldehyde were added to 125 ml. concentrated aqueous ammonia followed by the gradual addition under chilling of 70 ml. of a 40 percent aqueous commercial glyoxal solution. The mixture was allowed to stand for 48 hours at room temperature. The precipitate which formed was removed by filtration and the filtrate extracted on a liquid-liquid extraction over 48 hours utilizing ethyl acetate. The extract was evaporated in vacuo and the residue slurried with ether to recover the product which was then dissolved with the previously recovered precipitate in 200 ml. methanol, the solution charcoaled, the filtrate evaporated and the residue slurried with ether. The product, 2-(1-methyl-1-hydroxyethyl)imidazole, had a melting point of 202°–203°.

2.5 grams of the above product were dissolved in 250 ml. of hot distilled water. The solution was then chilled to 10°–20° with stirring and a solution of 10 grams iodine dissolved in 60 ml. of a 30 percent by weight aqueous sodium iodide solution was gradually added with 6 grams sodium carbonate. The crystalline product, 2-(1-methyl-1-hydroxymethyl)-4,5-diiodoimidazole was recovered, purified by dissolving in ethanol, precipitated with distilled water and found to have a melting point of 188°.

6 grams of 2-(1-methyl-1-hydroxyethyl)-4,5-diiodoimidazole were added in portions with stirring to a mixture of 10 ml. nitric acid ($d$=1.5) and 10 ml. concentrated sulfuric acid at 0°. The mixture was maintained at this temperature for 2 hours, allowed to warm to room temperature, poured onto ice, filtered, partially evaporated, neutralized to a pH of from 2–4 with ammonia and extracted with ethyl acetate. The product, 2-(1-methyl-1-hydroxyethyl)-4(or 5)iodo-5(or 4)nitroimidazole, was isolated by evaporation in vacuo and recrystallized in distilled water, melting point 183°.

119 grams of 2-(1-methyl-1-hydroxyethyl)-4(or 5)iodo-5(or 4)nitroimidazole were dissolved in 500 ml. 3N sodium carbonate solution and the solution chilled between 0° and 5°. While maintaining the temperature, 7.6 grams sodium borohydride were added with stirring. The reaction required 6–8 hours for completion during which approximately 2.4 grams of additional sodium borohydride was added in portions. When starting material could no longer be detected, 130 ml. acetic acid was added in one portion at 0°. The neutralized solution was extracted in a liquid-liquid extractor utilizing ethyl acetate. The extract was charcoaled and evaporated to dryness. The residue was recrystallized from 150 ml. distilled water to yield 2-(1-methyl-1-hydroxyethyl)-4(or 5)nitroimidazole melting point 192°–193°.

34.2 grams of the product, 2-(1-methyl-1-hydroxyethyl)-4(or 5)nitroimidazole were added to 50 ml. concentrated sulfuric acid and the mixture heated on a steambath for 1 hour the mixture was then poured over 200 grams of ice and neutralized to a pH of 2.5 under chilling with concentrated ammonia. The product, 2-isopropenyl-4(or 5)nitroimidazole crystallized rapidly from solution, was filtered, dried and found to have a melting point of 197°–198°.

EXAMPLE 2

In a suitable vessel was placed 17 g. of 2-isopropenyl-4(or 5)nitroimidazole and 32 g. of monotosylglycolate. 100 ml. of xylene were added and the mixture refluxed at 130°–135° for a period of 5 hours. The mixture was allowed to cool and the upper of the two layers which had formed was decanted. The remaining syrupy layer was taken up in 200 ml. methylenechloride, washed repeatedly with a 1N aqueous solution of sodium hydroxide, washed with water and finally dried over anhydrous magnesium sulfate. The solvent was evaporated and the residue crystallized by slurrying with petroleum ether to yield 5,6-dihydro-8,8-dimethyl-3-nitro-8H-imidazo(2-1-c)(1,4)oxazine. The product was recrystallized from 400 ml. of water, mp. 78°–79°.

EXAMPLE 5

Vaginal suppositories were prepared according to the following formulations and procedure.

| Ingredient | Per 1.3 gm. Suppository |
|---|---|
| 5,6-Dihydro-8,8-dimethyl-3-nitro-8H-imidazo(2-1-c)(1,4) oxazine | 0.100 g. |
| Wecobee M* | 1.155 g. |
| Carnauba Wax | 0.045 g. |

*A refined grade of synthetic coconut oil derived from cocoa butter available from E. F. Drew Co. 522 Fifth Avenue, New York, N.Y.

The Wecobee M and the carnauba wax were melted in a suitable glass lined container, mixed well and cooled to 45°. 5,6-Dihydro-8,8-dimethyl-3-nitro-8H-imidazo(2-1-c)(1,4)oxazine, which had been reduced to a lump-free fine powder, was added and stirred until completely and uniformly dispersed. The mixture was formed into suppositories in suitable molds, each such suppository weighing 1.3 g. The suppositories were removed from the molds, cooled and wrapped in wax paper for packaging.

EXAMPLE 4

Tablets were prepared according to the following formulation and procedure.

| Ingredient | Per Tablet |
|---|---|
| 5,6-Dihydro-8,8-dimethyl-3-nitro-8H-imidazo(2-1-c)(1,4)oxazine | 100 mg. |
| Dicalcium Phosphate | 60 mg. |
| Corn Starch | 157 mg. |
| Magnesium Stearate | 3 mg. |
| Total Weight | 320 mg. |

The 5,6-dihydro-8,8-dimethyl-3-nitro-8H-imidazo(2-1-c)(1,4)oxazine was thoroughly mixed with the remaining ingredients in a suitable mixer. The mixture was further blended by passage through a Fitzpatrick Comminuting Machine fitted with a No. 1A screen, knives forward. The mixed powders were slugged on a conventional tablet compressing machine. The slugs were then comminuted to a suitable mesh size (No. 16 screen) and mixed well. The resulting mixture was then compressed into tablets weighing 320 mg. using flat beveled face punches having a diameter of three-eighth inch.

Capsules were prepared in accordance with the following formulation and procedure.

| Ingredient | Per Capsule |
|---|---|
| 5,6-Dihydro-8,8-dimethyl-3-nitro-8H-imidazo(2-1-c)(1,4)oxazine | 250 mg. |
| Lactose | 50 mg. |
| Corn Starch | 45 mg. |
| Magnesium Stearate | 5 mg. |
| Total Weight | 350 mg. |

All ingredients were thoroughly blended in a suitable size container. The powder mixture was filled into No. 2 size, two piece, hard shell gelatin capsules to an approximate fill weight of 350 mg. per capsule using a Parke-Davis capsulating machine.

I claim:

1. A compound selected from the group consisting of 5,6-dihydro-8,8-dimethyl-3-nitro-8H-imidazo(2-1-c)(1,4)oxazine and pharmaceutically acceptable acid addition salts thereof.

* * * * *